United States Patent Office 3,078,291
Patented Feb. 19, 1963

3,078,291
PIVALYL FERROCENES
Robert J. Stephenson, Newport, Wales, assignor to Imperial Chemical Industries Limited, London, England, a corporation of Great Britain
No Drawing. Filed Dec. 21, 1959, Ser. No. 860,699
Claims priority, application Great Britain Jan. 7, 1959
7 Claims. (Cl. 260—439)

This invention relates to an improved manufacturing process and more particularly it relates to an improved process for the manufacture of ferrocene derivatives.

It is known that, when aluminium chloride is used as a catalyst in the Friedel Crafts reaction in the presence of an ether as a solvent or diluent, a complex is formed between the ether and the aluminium chloride.

We have now found that when a pivalyl halide reacts with ferrocene or an alkylferrocene in the presence of aluminium chloride as a catalyst and in the presence of an ether as a solvent, only one pivalyl radical is introduced into the said ferrocene and furthermore the aluminium chloride/ether complex does not decompose the pivalyl halide used in the reaction.

Thus according to the invention we provide a process for the manufacture of monopivalylferrocene derivatives which comprises reacting a pivalyl halide with a ferrocene derivative of the formula:

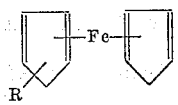

wherein R stands for hydrogen or for a hydrocarbon radical, optionally substituted, in the presence of aluminium chloride as a catalyst and in the presence of an ether as a diluent or solvent.

A suitable pivalyl halide may be, for example, pivalyl chloride, and a suitable ferrocene derivative may be, for example, ferrocene, or an alkylferrocene wherein the alkyl radical contains not more than nine carbon atoms, for example neopentylferrocene, or a substituted alkylferrocene wherein the alkyl radical contains not more than nine carbon atoms and is substituted by an unsubstituted or substituted phenyl radical, for example benzylferrocene, o-chlorobenzylferrocene or β-phenylethylferrocene.

The ether used as diluent or solvent is preferably a lower alkyl ether, for example diethyl ether, di-isopropyl ether or di-n-butyl ether. There may optionally be present an additional solvent or diluent which may be, for example, a chlorinated hydrocarbon, for example ethylene dichloride. The reaction is preferably carried out within a temperature range of −10° C. and 70° C.

The monopivalylferrocene derivatives with which this invention is concerned, other than monopivalylferrocene itself, are new compounds.

Thus according to a further feature of the invention we provide ferrocene derivatives of the formula:

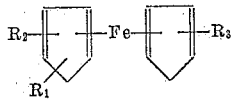

wherein $R_1$ stands for a hydrocarbon radical, optionally substituted, and of $R_2$ and $R_3$, one stands for hydrogen and the other stands for the pivalyl radical.

As suitable values of $R_1$ there may be mentioned, for example, unsubstituted alkyl radicals of not more than nine carbon atoms, for example the neopentyl radical, or alkyl radicals of not more than nine carbon atoms which are substituted by an unsubstituted or substituted phenyl radical, for example the benzyl, o-chlorobenzyl or β-phenylethyl radical.

The compounds with which this invention is concerned are useful as haematinics for the treatment of iron deficiency anaemia in man and animals.

Particularly valuable compounds are 1-neopentyl-1'-pivalylferrocene, 1-neopentyl-3-pivalylferrocene, 1-benzyl-1'-pivalylferrocene, 1-benzyl-3-pivalylferrocene, 1-(β-phenylethyl)-1'-pivalylferrocene and 1-(β-phenylethyl)-3-pivalylferrocene.

The invention is illustrated but not limited by the following examples in which the parts are by weight:

Example 1

To a solution of 16.5 parts of aluminium chloride in 63 parts of ethylene dichloride and 38 parts of di-isopropyl ether are added 13 parts of neopentylferrocene and 7 parts of pivalyl chloride. The reaction mixture is kept at 20° C. during 2 hours and is then evaporated to dryness in vacuo. The oily residue is poured on to ice, the mixture is extracted with diethyl ether and the ethereal extract is washed successively with dilute sulphuric acid, water, dilute sodium hydroxide solution and water. It is then dried over anhydrous sodium sulphate and is evaporated to dryness. The residue is resolved by chromatographic separation on activated alumina using benzene as eluant and there is thus obtained 1-neopentyl-1'-pivalylferrocene, M.P. 56–57° C., and 1-neopentyl-3-pivalylferrocene, M.P. 110° C.

The above process is repeated except that the 38 parts of di-isopropyl ether are replaced by an equal quantity of di-n-butyl ether. There are thus obtained 1-neopentyl-1'-pivalylferrocene and 1-neopentyl-3-pivalylferrocene.

Example 2

To a solution of 16.5 parts of aluminium chloride in 63 parts of ethylene dichloride and 38 parts of di-isopropyl ether are added 4.7 parts of ferrocene and 7 parts of pivalyl chloride. The reaction mixture is heated under reflux during 30 minutes and is then evaporated in vacuo. The residual complex is dissolved in diethyl ether and is then poured on to ice. The ethereal layer is removed and is washed successively with dilute sulphuric acid, water, dilute sodium hydroxide solution and water, and is then dried over anhydrous sodium sulphate. The solvent is removed by evaporation and the residue is crystallised from methanol. There is thus obtained monopivalylferrocene, M.P. 87–90° C.

The above process is repeated except that the 38 parts of di-isopropyl ether are replaced by an equal quantity of di-n-butyl ether. There is thus obtained monopivalylferrocene.

Example 3

186 parts of ferrocene and 150 parts of pivalyl chloride are added to a solution of 292 parts of aluminium chloride in 1400 parts of diethyl-ether containing 10 parts of aluminium powder. The reaction mixture is stirred and heated under reflux during 5 hours and is then cooled and poured on to ice. The ethereal layer is separated and is washed successively with dilute sulphuric acid, water, dilute sodium hydroxide solution and water, and is then dried over anhydrous sodium sulphate. The solvent is removed by evaporation and the residue is crystallized from petroleum ether, (B.P. 40–60° C.) There is thus obtained monopivalylferrocene, M.P. 87–90° C.

The above process is repeated except that the 1400 parts of diethyl ether are replaced by an equal quantity of di-n-butyl ether. There is thus obtained monopivalylferrocene.

Example 4

40 parts of n-propylferrocene, 27.5 parts of pivalyl chloride and 28 parts of aluminium chloride are dissolved in 178 parts of anhydrous diethyl ether containing 2.5 parts of aluminium powder. The mixture is stirred at room temperature (22° C.) for 16 hours and then poured on to ice. The mixture is separated and the ethereal solution is washed with water until it is acid-free. The ethereal solution is then dried and evaporated to dryness. The residue is purified by chromatographic analysis on alumina and there are thus obtained 1-pivalyl-1'-n-propylferrocene, B.P. 166° C./2 mm., and 1-pivalyl-3-n-propylferrocene, B.P. 158-160° C./2 mm.

*Example 5*

To a solution of 56 parts of aluminium chloride and 85 parts of crude isobutylferrocene in 356 parts of anhydrous diethyl ether are added 6 parts of aluminium powder and 54.5 parts of pivalyl chloride. The mixture is stirred for 20 hours at room temperature and then poured on to ice. The mixture is separated and the aqueous layer is extracted with diethyl ether. The combined ethereal solution and ethereal washings are washed with water until they are free from acid. The ethereal solution is dried and evaporated to dryness. The residue is dissolved in benzene and purified by chromatographic analysis on alumina using benzene as eluant. There is thus obtained 1-isobutyl-1'-pivalylferrocene, B.P. 150° C./1 mm.

The crude isobutylferrocene which is used as starting material may be obtained as follows:

112 parts of ferrocene and 10 parts of aluminium powder are added to a solution of 106.5 parts of aluminium chloride and 81.5 parts of isobutyryl chloride in 535 parts of anhydrous diethyl ether. The mixture is stirred at room temperature for eighteen hours and then poured on to ice. The mixture is separated and the aqueous solution is extracted with diethyl ether. The combined ethereal solution and ethereal washings are washed with water until acid-free and then dried. The solution is evaporated to dryness and there is thus obtained crude isobutyrylferrocene.

400 parts of granulated zinc are amalgamated according to the known art and there are added 840 parts of glacial acetic acid, 1300 parts of concentrated hydrochloric acid and 128 parts of crude isobutyrylferrocene. The mixture is stirred at 90-95° C. for 2 hours and is then poured into water. The mixture is separated by decantation and both the solid residue and the aqueous mixture are retained. The solid residue is washed with petroleum ether (B.P. 40-60° C.) and the aqueous mixture is extracted with said petroleum ether washings. The organic solution is washed with water until acid-free and then dried. The organic solution is purified by passage through an alumina column, and is then evaporated to dryness. There is thus obtained crude isobutylferrocene.

*Example 6*

40 parts of aluminium chloride are dissolved in 267 parts of anhydrous diethyl ether containing 5 parts of aluminium powder. To this mixture 72.5 parts of crude β-phenylethylferrocene and 39.5 parts of pivalyl chloride are added. The mixture is stirred at room temperature for 17 hours and then poured on to ice. The mixture is separated and the aqueous solution is extracted with diethyl ether. The combined ethereal solution and ethereal washings are washed with water until acid-free, dried, and then evaporated to dryness. The residue is dissolved in benzene and purified by chromatographic analysis on an alumina column. There is thus obtained 1-(β-phenylethyl)-1'-pivalylferrocene, M.P. 93-94° C., and 1-(β-phenylethyl)-3-pivalylferrocene, M.P. 81-82° C. The β-phenylethylferrocene used as starting material may be obtained as follows:

106.5 parts of aluminium chloride are dissolved in 535 parts of anhydrous diethyl ether. To this solution are added 10 parts of aluminum powder, 133 parts of phenylacetyl chloride and 124 parts of ferrocene. The mixture is stirred at room temperature for eighteen hours. It is then poured on to ice and the mixture is separated. The aqueous solution is extracted with diethyl ether and combined ethereal solution and ethereal washings are washed with water until acid-free and dried. The solvent is removed by distillation and the residue is dissolved in benzene and adsorbed on an alumina column. Unreacted ferrocene is eluted from the column using benzene as eluant, and phenylacetylferrocene is eluted from the column using methanol as eluant. The methanolic solution is evaporated to dryness and there is thus obtained crude phenylacetylferrocene.

270 parts of granulated zinc are amalgamated according to the known art and to these are added 567 parts of glacial acetic acid, 860 parts of concentrated hydrochloric acid and 101 parts of crude phenylacetylferrocene. The mixture is stirred at 90-95° C. for 3 hours and then poured into water. The mixture is separated by decantation and both the solid residue and the aqueous mixture are retained. The solid residue is washed with petroleum ether (B.P. 40-60° C.) and the aqueous mixture is extracted with said petroleum ether washings. The organic solution is washed with water until acid-free, dried, and the solvent is removed by distillation. There is thus obtained crude β-phenylethylferrocene.

What I claim is:

1. Ferrocene derivatives selected from the group consisting of compounds of the formulae:

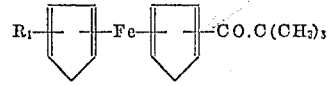

and

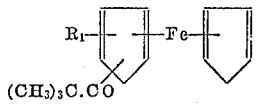

wherein $R_1$ is selected from the group consisting of alkyl of not more than nine carbon atoms, phenylalkyl wherein the alkyl contains not more than nine carbon atoms, and halophenylalkyl wherein the alkyl contains not more than nine carbon atoms.

2. 1-neopentyl-1'-pivalylferrocene.
3. 1-neopentyl-3-pivalylferrocene.
4. 1-benzyl-1'-pivalylferrocene.
5. 1-benzyl-3-pivalylferrocene.
6. 1-(β-phenylethyl)-1'-pivalylferrocene.
7. 1-(β-phenylethyl)-3-pivalylferrocene.

References Cited in the file of this patent

Woodward et al.: J.A.C.S., vol. 74, pp. 3458-9, July 5, 1952.

Organic and Biological Chemistry, June 5, 1957, pp. 2741-2746, vol. 79.

Rosenblum: Thesis on Ferrocene, deposited for use in Harvard's Library, Feb. 19, 1954, pp. 18-21 and 84-87.